United States Patent [19]

Balint

[11] 4,171,284

[45] Oct. 16, 1979

[54] CATALYST SYSTEM

[75] Inventor: Nikolaus K. Balint, Naperville, Ill.

[73] Assignee: Standard Oil Company (Indiana), Chicago, Ill.

[21] Appl. No.: 881,828

[22] Filed: Feb. 27, 1978

[51] Int. Cl.² ................................................ C08F 4/64
[52] U.S. Cl. .............................. 252/429 B; 526/137; 526/138; 526/146
[58] Field of Search ..................................... 252/429 B

[56] References Cited

U.S. PATENT DOCUMENTS

| | | | |
|---|---|---|---|
| 2,959,576 | 11/1960 | Payne | 252/429 B X |
| 2,971,950 | 2/1961 | Natta et al. | 252/429 B X |
| 3,072,630 | 1/1963 | de Jong et al. | 252/429 B X |
| 3,121,064 | 2/1964 | Patat et al. | 252/429 B |
| 3,129,256 | 4/1964 | Hay et al. | 252/429 B X |
| 3,161,628 | 12/1964 | Dost et al. | 526/132 X |
| 3,271,381 | 9/1966 | Andersen et al. | 252/429 B X |
| 3,328,366 | 6/1967 | Nakaguchi et al. | 252/429 B X |
| 3,549,717 | 12/1970 | Itakura et al. | 252/429 B X |
| 3,627,797 | 12/1971 | Durst et al. | 252/429 B X |
| 3,670,043 | 6/1972 | Kubicek et al. | 252/429 B X |
| 3,692,712 | 9/1972 | Crouch et al. | 260/878 R |
| 3,719,652 | 3/1973 | Oberkirch et al. | 252/429 B X |
| 3,770,839 | 11/1973 | Matsushima | 252/429 B X |
| 3,784,481 | 1/1974 | Lassau et al. | 252/429 B X |
| 3,985,677 | 10/1976 | Throckmorton et al. | 252/429 B |
| 4,029,866 | 6/1977 | Kennedy | 252/431 R X |
| 4,081,590 | 3/1978 | Kennedy | 252/431 R X |
| 4,088,812 | 5/1978 | Matuura et al. | 252/429 C X |

FOREIGN PATENT DOCUMENTS 1492549 11/1977 United Kingdom .

*Primary Examiner*—Patrick Garvin
*Attorney, Agent, or Firm*—Wallace L. Oliver; Arthur G. Gilkes; William T. McClain

[57] ABSTRACT

A propylene polymerization catalyst is formed by incorporation into a catalytic mixture, comprising a transition metal compound and an organoaluminum compound, effective amounts of hexavalent sulfur mineral acid or anhydride whereby the amount of n-hexane-soluble polymeric product is decreased.

22 Claims, No Drawings

CATALYST SYSTEM

BACKGROUND OF THE INVENTION

This invention relates to propylene polymerization catalysts and particularly relates to catalyst systems which produce commercially acceptable levels of low molecular weight and, especially, substantially amorphous polymers as determined by the amount of polymerized product which is soluble in n-hexane at room temperature ("Hexane Solubles").

The polymerization of propylene to normally-solid, substantially crystalline polymers using heterogeneous catalysts comprising transition metal halides and aluminum alkyls now is well known in the art. However, there is a continuing need in the industry for complete catalyst systems which produce a high yield, as measured by the grams of crystalline product per gram of transition metal halide consumed, while producing a minimum amount of Hexane Solubles. In a slurry polymerization process which uses a hydrocarbon solvent, such as n-hexane, amorphous and low molecular weight polymer accumulates in the solvent which necessitates extensive solvent purification procedures. Since the economic value of such n-hexane-soluble polymer is lower than normally-solid, substantially crystalline product, the overall process becomes less efficient as the amount of Hexane Solubles increase. A commercially desirable catalyst system would produce low amounts of Hexane Solubles while maintaining reasonable yields. The product produced using such catalyst system desirably has acceptable odor and environmental qualities. Also desirable is a low concentration of residual titanium.

In a solventless, liquid-phase bulk polymerization or in a gas phase process, the production of polymers which contain more than about 2% of Hexane Solubles requires a separate extraction procedure to produce commercially acceptable products and makes these inherently efficient processes uneconomical. Therefore, polymerization processes which produce low amounts of Hexane Solubles while not adversely affecting polymerization yield are in demand.

Various catalyst modifiers in addition to transition metal halides and aluminum alkyls have been disclosed to minimize Hexane Solubles in alpha-olefin polymerizations. Such modifiers include aromatic or aliphatic amines, esters, amides, phosphites, phosphines, phosphine oxides, aldehydes, tetraorganosilyl compounds such as tetraalkyl-, tetraaryl- and tetraalkoxysilanes, sterically hindered cyclic amines, amine N-oxides and organotin sulfides. Known catalyst modifiers include the combination of hydrogen sulfide, sulfur dioxide or bis(tributyl)tin sulfide with an aromatic amine or amine oxide such as lutidine, collidine (2,4,6-trimethylpyridine) and lutidine-N-oxide. Specific catalyst systems including such combinations of modifiers are described in U.S. Pat. Nos. 3,950,268 and 4,072,809 both incorporated by reference herein. Although such modifiers do tend to decrease Hexane Solubles, they or their reaction products may produce undesirable odor or other effects in polymeric product.

Molecular weights of alpha-olefin polymers have been controlled by addition of "hydrogen active" compounds such as mineral acids to the olefin stream or directly to the polymerization reaction (U.S. Pat. No. 3,161,628). U.S. Pat. No. 2,971,950 discloses adding anhydrous hydrogen halide or alkyl halide to an alpha-olefin polymerization to control molecular weight. U.S. Pat. No. 3,271,381 uses 0.5 to 3 gram-equivalents of a strong acid per gram-atom of titanium to control molecular weight of polyolefins.

The use of halogen acids, e.g., HCl or HBr, to treat catalyst supports is taught in U.S. Pat. Nos. 3,658,722 and 3,888,789. Hydrogen chloride gas has been incorporated in alpha-olefin polymerization to produce elastomers (U.S. Pat. No. 3,563,964) and to change polymerization to a cationic process (U.S. Pat. No. 3,692,712). U.S. Pat. No. 3,275,569 teaches reducing titanium tetrahalide with aluminum in the presence of a hydrogen halide to form a polymerization catalyst component, while U.S. Pat. No. 2,256,264 teaches a polymerization catalyst system from a halogenated metal of groups IVa, Va, or VIa (e.g. $TiCl_4$), aluminum chloride, hydrogen chloride and powdered aluminum. U.S. Pat. No. 3,121,064 teaches regenerating a titanium halide catalyst component with dry halogen chloride. Sulfur dioxide and sulfur trioxide have been disclosed to treat an olefin polymerization catalyst component consisting of a titanium or vanadium compound supported on a metal oxide or hydroxide (U.S. Pat. No. 4,027,088 and British Pat. No. 1,492,549).

Certain mineral and organic acids and anhydrides have been used in olefin polymerization systems which do not employ an organo aluminum-transition metal compound catalyst to form crystalline polymers. References to such systems are made in U.S. Pat. Nos. 3,426,007, 3,476,731, 3,497,488, U.S. Pat. No. Re. 29,504, U.S. Pat. Nos. 3,676,523, 3,686,351, 3,850,897, 3,896,087, and 4,029,866.

Carboxylic acids have been added to ethylene polymerization to reduce deposition of polymer on reactor walls (U.S. Pat. No. 3,082,198). Alkali metal salts of inorganic oxyacids have been used in an olefin polymerization catalyst comprising an aluminum sesquihalide and a transition metal halide (U.S. Pat. No. 3,400,084). Acid and base ion exchange resins have been used in olefin polymerization systems to produce crystalline polymer (U.S. Pat. No. 3,595,849).

An object of this invention is to produce catalyst modifiers which decrease Hexane Solubles while maintaining reasonable polymerization activity. A further object of this invention is to produce a polymeric product having acceptable odor. Other objects are described herein.

SUMMARY OF THE DISCLOSURE

A propylene polymerization catalyst is formed by incorporating into a catalytic mixture comprising a transition metal compound and an organo aluminum compound, effective amounts of hexavalent sulfur mineral acid or anhydride whereby the amount of n-hexane-soluble polymeric product is decreased.

BRIEF DESCRIPTION OF THE INVENTION

Advantages of this invention include catalyst system which produces a commercially acceptable amount of Hexane Solubles polymer while maintaining reasonable catalytic activity. Further, catalyst modifiers of this invention generally do not introduce unacceptable levels odor-forming compounds nor known compounds which may be environmentally detrimental. Since the modifiers of this invention are mineral acids or anhydrides, possibly harmful complex organic compounds are not added to the polymerization system.

The modifiers useful in this invention are hexavalent sulfur mineral acids or anhydrides. Examples of such compounds are sulfuric acid, oleum, halosulfonic acids such as chlorosulfonic acid and fluorosulfonic acid, and sulfur trioxide. Sulfur trioxide ($SO_3$) is the anhydride of a hexavalent sulfur mineral acid, i.e. sulfuric acid. Sulfuric acid useful in this invention preferably is concentrated aqueous sulfuric acid incorporating about 96% $H_2SO_4$. Fuming sulfuric acid typically is oleum containing about 27–33 wt.% free $SO_3$. Less concentrated sulfuric acid is useful, although as the acid concentration decreases, excess water should be removed, for example, by adding more organoaluminum compound. More concentrated sulfuric acid, also useful, is manufactured by combining sulfur trioxide and water. A combination of equal molal quantities of $SO_3$ and water results in 100% sulfuric acid. If more than an equal molal amount of $SO_3$ is added, the resulting material typically is called oleum, the strength of which usually is expressed as a percentage of free $SO_3$ in the acid. Properties of sulfuric acid and oleum are given below:

| Strength | Equivalent $H_2SO_4$ (%) | Sp. Gr. (15.6° C.) | Freezing Point (°C.) |
|---|---|---|---|
| 60° Be | 77.67 | 1.706 | −12 |
| 66° Be | 93.19 | 1.835 | −35 |
| 96% | 96 | 1.843 | −14 |
| 98% | 98 | 1.844 | −2 |
| 99% | 99 | 1.842 | 4 |
| 100% | 100 | 1.839 | 11 |
| 10% oleum | 102.25 | 1.880 | 0 |
| 20% oleum | 104.50 | 1.915 | −5 |
| 25% oleum | 105.62 | 1.934 | 9 |
| 30% oleum | 106.75 | 1.952 | 19 |
| 60% oleum | 114.63 | 1.992 | 2 |

Examples of hexavalent sulfur mineral acids are discussed in Kirk-Othmer, Encyclopedia of Chemical Technology, Second Edition, in Vol. 19, pages 242–249 and 441–482, Vol. 9, pages 676–681, and Vol. 5, pages 357–363, all such pages are incorporated by reference herein.

The exact amount of the modifiers useful in this invention varies depending upon the specific modifier, the precise make-up of the other catalyst components, and the polymerization conditions. Typically effective amounts range from a molar ratio to the transition metal compound of about 0.005 to 1 to about 0.7 to 1 and preferably about 0.01 to 1 to about 0.5 to 1. If sulfuric acid, fuming sulfuric acid or sulfur trioxide is used, the preferable amount is present in a molar ratio to the transition metal compound of about 0.01 to 1 to about 0.5 to 1. If chlorosulfonic acid is used, the preferable amount is present in a molar ratio to the transition metal compound of about 0.01 to 1 to about 0.1 to 1. The concentration of modifiers must be sufficient to show a decrease in Hexane Solubles. At reasonably low levels of modifiers, the yield of polymeric product is not seriously affected. However, at higher levels of modifier the yield of product tends to decrease. An optimum level of modifier will produce both acceptable yields of Hexane Solubles and polymeric product.

For the purpose of determining Hexane Solubles, the "n-hexane" used is a mixture of substantially C-6 hydrocarbons containing about 85–88 wt. % normal hexane.

Although not preferred, modifiers of this invention can be utilized in conjunction with effective catalyst coadditives such as alkyl silicates, orthosilicate esters, esters, Lewis bases such as phosphines, phosphites, phosphates, phosphine oxides, aromatic amines, amine oxides, tertiary aliphatic amines and ethers or an organometallic chalcogenide such as bis(trialkyl)tin sulfide. These additional additives can be present in minor amounts ranging from about one-tenth to 30 mol percent and preferably about 1 to 20 mol percent of the transition metal halide in the catalyst system. Two or more suitable hexavalent sulfur mineral acids can be combined and used in this invention. In addition, the hexavalent sulfur mineral acids or anhydrides can be mixed with other compatible mineral acids for use in this invention.

The catalyst system described in this invention contains (a) an organoaluminum compound and (b) a transition metal compound in addition to minor amounts of other additives.

Useful organoaluminum compounds include trialkylaluminum, dialkylaluminum halides, mixtures of trialkylaluminum with dialkylaluminum halides and mixtures of trialkylaluminum with alkylaluminum dihalides. Also catalytic effective amounts of mixtures of trialkylaluminums and dialkylaluminum halides can be used in conjunction with alkyl aluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable. In a trialkylaluminum-dialkylaluminum halide mixture, the preferred amount of trialkylaluminum is about 20 to 50 mol percent. In a trialkylaluminum-alkylaluminum dihalide mixture, the preferred amount of trialkylaluminum is about 30 to 70 mol percent and most preferably about 40 to 60 mol percent.

The transition metal compounds useful as a component in the catalyst system of this invention are compounds of transition metals of Groups IVB, VB and VIB of the Periodic Table. Preferably, the transition metal compound is a halide of titanium, vanadium, chromium or zirconium. Most preferably, titanium trichloride and especially activated titanium trichloride is used. Titanium trichloride can be activated to a high degree of polymerization activity by chemical and physical means. One useful activated titanium trichloride has an approximate stoichiometric formula of $TiCl_3.\frac{1}{3}AlCl_3$ and has been comminuted. Further, titanium trichloride can be activated by forming adducts with Lewis bases such as ethers or by supporting the titanium trichloride on a catalytically inert substance such as a metal oxide or salt. One suitable titanium trichloride is described in U.S. Pat. No. 3,984,350 incorporated by reference herein.

The molar ratio of transition metal halide to organoaluminum compound in a catalyst system can range from about one-tenth to about 10, typically is about 1 to 3 and preferably is about 2. The amount of catalyst in a polymerization depends on the reactor size and type and on the amount and type of olefin monomer and is known to the skilled artisan.

Preferably, a catalyst system package is made prior to introduction of such package into a polymerization reactor. Catalyst components can be mixed together in any order, typically using an inert hydrocarbon or the monomer as a suitable medium, although preferably the modifiers first are added to an inert hydrocarbon solution of the organoaluminum compound. Preferably, the catalyst modifiers of this invention are added slowly while mixing to a solution of organoaluminum compound in an inert hydrocarbon. Such resulting mixture is added to a suspension of transition metal compound in an inert hydrocarbon. After complete mixing the resulting catalyst package can be introduced into a polymerization reactor.

Since the catalyst systems used in this invention are sensitive to oxygen and moisture, suitable precautions should be taken during catalyst preparation, transfer and use.

The polymerization process of this invention can be practiced at pressures ranging from about atmospheric to about 20,000 p.s.i.g. and preferably from about 30 to 1000 p.s.i.g.

The polymerization time depends on the process used. In batch processes the polymerization contact time usually is about one-half to several hours and typically is one to four hours in autoclave processes. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The liquid organic solvents used in the slurry polymerization technique include aliphatic alkanes and cycloalkanes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, chloronaphthalene or o-dichlorobenzene. Other suitable solvents include ethylbenzene, isopropylbenzene, ethyltoluene, n-propylbenzene, diethylbenzenes, mono and di-alkylnaphthalenes, n-pentane, n-octane, isooctane and methyl cyclohexane. Preferably, liquid hydrocarbons are used; most preferably, n-hexane is the polymerization medium. Although the nature of the solvent can be varied considerably, the solvent should be liquid under the reaction conditions and should be relatively inert. Advantageously, the solvent used can be purified prior to use by distillation, by reaction with an aluminum alkyl, or by adsorption with molecular sieves.

The polymerization temperature depends upon the specific catalyst system used and can range from below about 0° C. to about 120° C. However, at temperatures below about 0° C. the polymerization rate slows and reactor residence times become unreasonably long, while at temperatures above about 120° C. the polymerization rate is too high which results in excessive amounts of n-hexane-soluble products. Preferably, the temperature ranges from about 2° C. to about 95° C. and most preferably from about 50° C. to about 80° C.

After polymerization catalyst residues contained in the polymeric product can be deactivated by conventional methods such as washing with methanol, water and caustic. Washing polymer with water and caustic is believed to transform sulfur compounds, contained in residual catalyst modified with sulfuric acid, to sulfate ion.

This invention is useful in polymerizing propylene to a normally solid, substantially crystalline polymer, although propylene also can be polymerized with minor amounts up to about 30 wt.% of ethylene or other copolymerizable alpha-olefins containing up to 10 carbon atoms to form random, pure-block, terminal block and multisegment copolymers.

The normally-solid propylene polymers prepared according to this invention have molecular weights ranging from about 50,000 to 5,000,000 and typically range from about 200,000 to 2,000,000. The molecular weights of such propylene polymers can be controlled by methods known to the art, such as by polymerizing in the presence of hydrogen in an amount determined by melt flow rate or by the molecular weight distribution desired.

This invention is demonstrated but not limited by the following Examples.

EXAMPLES I-VI

A series of propylene polymerizations were performed using various hexavalent sulfur mineral acids as catalyst modifiers. In addition, control runs were performed without modifiers of this invention.

Modified catalyst was prepared in a nitrogen-purged dry box by adding a measured amount of modifier dropwise with stirring to a portion of diethylaluminum chloride (25 wt.% in hexane). This mixture then was added dropwise with stirring to a suspension of titanium trichloride in hexane. The quantities were measured such that two moles of DEAC were added to one mole of $TiCl_3$.

Two milliliters of the resulting modified DEAC-$TiCl_3$ mixture were diluted with 200 milliliters of dry n-hexane in a 450 milliliter pressure bottle which was sealed, placed in a water bath maintained at 160° F. Propylene was introduced into the bottle and a pressure of 40 p.s.i.g. maintained for two hours while stirring magnetically. After two hours the bottle was cooled, uncapped and the contents filtered. A 10% aliquot was taken from the filtrate and evaporated. The remaining solid material was weighed to determine the amount of Hexane Solubles. The filtered solid polypropylene was vacuum dried and weighed. Results are shown in Table I.

TABLE I

| Example (Run) | Catalyst (Molar Ratio) | Yield (g/g of $TiCl_3$) | Hexane Solubles (Wt. %) |
|---|---|---|---|
| (A) | DEAC/AA $TiCl_3$[1] (2/1) | 133 | 3.41 |
| (B) | DEAC/AA $TiCl_3$/BTS/Collidine (2/1/0.02/0.02) | 119 | 1.50 |
| I | DEAC/AA $TiCl_3$/Sulfuric Acid (96%) (2/1/0.09) | 107 | 2.0 |
| II | DEAC/AA $TiCl_3$/$H_2SO_4$—$SO_3$[2] (2/1/0.05) | 100 | 1.8 |
| III | DEAC/AA $TiCl_3$/$SO_3$ (2/1/0.01) | 93.5 | 1.5 |
| IV | DEAC/AA $TiCl_3$/Sulfuric Acid (96%)/Nitric Acid | 100 | 2.9 |

TABLE I-continued

| Example (Run) | Catalyst (Molar Ratio) | Yield (g/g of TiCl₃) | Hexane Solubles (Wt. %) |
|---|---|---|---|
| (C) | DEAC/ABC-TiCl₃[3] (2/1) | 335 | 1.02 |
| (D) | DEAC/ABC-TiCl₃/BTS/Collidine (2/1/0.02/0.02) | 312.5 | 0.76 |
| V | DEAC/ABC-TiCl₃/Sulfuric Acid (96%) (2/1/0.04) | 273.8 | 0.8 |
| VI | DEAC/ABC-TiCl₃/H₂SO₄—SO₃ (2/1/0.04) | 286.3 | 0.71 |

[1] AA TiCl₃-Stauffer Chemical Company Type 1.1
[2] H₂SO₄—SO₃-Fuming sulfuric acid-oleum (27-33 wt. % free SO₃)
[3] ABC-TiCl₃ (prepared according to U.S. Pat. No. 3,984,350)

EXAMPLES VII–XVII

A series of propylene polymerizations using hexavalent sulfur mineral acids as a catalyst modifier were performed in a one-gallon autoclave. Modified catalysts were made using the procedure described in Examples I–VI. For polymerization, a one-gallon, glass-lined, stirred, nitrogen-flashed autoclave was charged with 1550 milliliters of dry n-hexane and heated to about 140° F. To this autoclave, catalyst slurry containing 0.4 grams of TiCl₃ was added followed by 5 to 6 added p.s.i.g. of hydrogen and 1830 milliliters of liquid propylene with the temperature maintained at about 142° F. and the pressure at about 210 p.s.i.g. The temperature was increased to about 160° F. and a constant pressure of about 240 p.s.i.g. was maintained by continued addition of propylene. After polymerizing four hours, the autoclave was vented and polymer slurry was removed. Residual catalyst was deactivated by adding 100 milliliters of methanol and stirring for 30 minutes at 160° F.

The amount of Extractables was determined by measuring the loss in weight of a sample of dry, ground polymer after being extracted in boiling n-hexane for six hours. Results are shown in Table II.

TABLE II

| Example (Run) | Catalyst (Molar Ratio) | Yield (g/g of TiCl₃) | Hexane Solubles (%) | Extractables (%) | Bulk Density (lb/ft³) |
|---|---|---|---|---|---|
| (E) | DEAC/AA TiCl₃(1) (2/1) | 1558 | 12.6 | (2) | 24.8 |
| (F) | DEAC/AA TiCl₃/H₂S/Collidine (2/1/0.02/0.02) | 1480 | 5.8 | 1.3 | 25.1 |
| VII | DEAC/AA TiCl₃/H₂SO₄ (96%) (2/1/0.3) | 1228 | 5.7 | (2) | 25.1 |
| VIII | DEAC/AA TiCl₃/H₂SO₄—SO₃ (3) (2/1/0.15) | 1568 | 4.2 | 1.2 | 24.7 |
| IX | DEAC/AA TiCl₃/SO₃ (2/1/0.15) | 1430 | 3.4 | 1.1 | 25.5 |
| (G) | DEAC/AA TiCl₃/BTS/Collidine (4) (2/1/0.02/0.02) | 1342 | 6.2 | (2) | (2) |
| X | DEAC/AA TiCl₃/H₂SO₄ (96%) (2/1/0.2) | 1682 | 5.9 | (2) | (2) |
| XI | DEAC/AA TiCl₃/H₂SO₄ (96%) (2/1/0.3) | 1380 | 5.6 | (2) | (2) |
| XII | DEAC/AA TiCl₃/H₂SO₄ (96%) (2.4/1/0.2) | 1668 | 6.2 | (2) | (2) |
| (H) | DEAC/AA TiCl₃/H₂S/Collidine (5) (2.1/0.02/0.02) | 800 | 6.1 | 1.2 | 26.0 |
| XIII | DEAC/AA TiCl₃/H₂SO₄ (96%) (5) (2/1/0.15) | 1180 | 5.8 | 1.4 | 27.6 |
| XIV | DEAC/AA TiCl₃/H₂SO₄—SO₃ (5) (2/1/0.15) | 900 | 5.0 | 1.4 | 27.2 |
| XV | DEAC/AA TiCl₃/CSA (6) (2/1/0.03) | 1608 | 6.9 | 1.8 | 25.3 |
| XVI | DEAC/AA TiCl₃/CSA (2/1/0.06) | 1512 | 4.1 | 1.1 | 25.3 |
| XVII | DEAC/AA TiCl₃/CSA (2/1/0.09) | 1242 | 4.2 | 1.1 | 22.5 |

(1) AA TiCl₃-Stauffer Chemicals, Type 1.1
(2) Not measured
(3) H₂SO₄—SO₃-fuming sulfuric acid-oleum(27-33 wt. % free SO₃)
(4) BTS - Bis-(tributyl)tin sulfide
(5) Polymerization time - 2 hours
(6) CSA - Chlorosulfonic acid

EXAMPLES XVIII–XX

A series of propylene polymerizations were performed in a 30-gallon reactor using a catalyst modified with various hexavalent sulfur mineral acids.

A catalyst package was prepared by adding a measured amount of modifier dropwise to DEAC (25% in hexane) in a nitrogen-purged drybox with stirring. Then the DEAC-modifier mixture was added dropwise to a suspension of 15.16 grams of TiCl₃ while stirring. For polymerization, after 51.3 pounds of hexane, 30.8 pounds of propylene and 6 to 7 added p.s.i.g. of hydrogen were charged to a 30-gallon autoclave vessel, the prepared catalyst package was introduced. The vessel was maintained at about 155° F. while stirring at 425-450 rpm. Constant pressure of about 260 p.s.i.g. was maintained by continuous addition of propylene. After the polymerization time, the vessel was partially vented and the contents transferred into a separate tank in which the remaining catalyst was deactivated with methanol (10 vol.% in water) and sodium hydroxide (5 wt.% in water), after which the polypropylene product was washed with water. After liquids were decanted, the remaining solid product was neutralized, filtered and tumble dried. Results are shown in Table III.

Batches using similar preparative techniques were combined and properties of such combined and stabilized materials are shown in Table IV.

An odor panel, consisting of at least six individual, evaluated unidentified pellets produced from the polymers that were produced in Examples XVIII-XX and in Run J.

One day before an odor evaluation, pellets were placed in wide-mouth, half-gallon, glass jars fitted with aluminum foil-lined caps which had been thoroughly cleaned and flushed with hot air. The sniffing technique was to pick up a sample jar in both hands, shake it twice, loosen the cap but not remove it from the jar, hold mouth end of the jar up to the face approximately one to two inches from the nose, lift the cap from the jar and quickly take three to four sniffs of the jar air space and then replace the tighten the cap. Panelists breathed deeply through the nose for about 30 seconds before sniffing again. In order to minimize any fluctuation in odor sensitivity, the panel only met at one time during a day.

Odor intensity was rated according to the following relative scale:
0—no detectable odor
1—barely detectable (Several sniffs are necessary to decide if an odor is present.)
2—detectable (Little effort is required to detect odor on opening of jar.)
3—noticeable (Implies an inability to escape attention.)
4—prominent (More striking than 3 and seems to overwhelm sense of smell.)
5—strong and lingering (Causes aftertaste in mouth and nose needs longer to recover.)

The quality of odor was described in any term familiar to the panelists. At the end of each evaluation, the panel discussed odor intensity and quality and attempted to reach a consensus.

The panel consensus was that all samples tested in a first evaluation exhibited a noticeable odor with an intensity of 3 on a scale of 0 to 5, although there were differences in odor quality. Pellets made from Run J had a collidine, musty, burnt odor while samples made from Examples XVIII-XX had sour, sulfury, acidic and burnt qualities. Example XX had a very strong hexane odor apparently caused by incomplete devolatilization. After all samples were heated over a weekend at 150° F. under a nitrogen purge, the odor panel reevaluated these stripped samples with a consensus that the odor intensity was barely detectable in Run J (1 on a scale of 0-5) and detectable for Examples XVIII-XX (2 on a scale of 0-5). The odor qualities for Run J were waxy, musty and burnt and for Examples XVIII-XX were sulfury, onion and sour. Unstripped pellets were molded into cups. The odor panel found the cup made from polymer produced in Run J to have odor with noticeable intensity and a typical slurry, musty quality. Cups made from polymers of Examples XVIII-XX had a noticeable burnt odor but not musty. After sitting at room temperatures of a day in sealed bags the odor of samples of Example XVIII-XX decreased in intensity to barely detectable and had a lemony character but not burnt. The sample of Run J retained its musty character. Two members of the panel speculated that because the rapid dissipation of the burnt odor, such phenomenon resulted from the molding operation and resided on the surface of the cups. The panel's summary was that the odor exhibited in polymer made in Examples XVIII-XX had another odor quality which is less objectionable in quality to that noticed in polymer made in Run J.

TABLE III

| Example (Run) | Catalyst (Molar Ratio) | Yield (g/g of TiCl$_3$) | Hexane Solubles (wt. %) | Melt Flow Rate (g/10 min.) |
|---|---|---|---|---|
| (H) | DEAC/AA TiCl$_3$[1] (2/1) | 1000 | 21 | 4.3 |
| (J(a)) | DEAC/AA TiCl$_3$/H$_2$S/Collidine (2/1/0.02/0.02) | 1006 | 4.8 | 5.1 |
| (J(b)) | DEAC/AA TiCl$_3$/H$_2$S/Collidine (2/1/0.02/0.02) | 1003 | 4.7 | 2.4 |
| XVIIIX(a) | DEAC/AA TiCl$_3$/H$_2$SO$_4$ (96%) (2/1/0.3) | 944 | 5.5 | 5.7 |
| XVIII(b) | DEAC/AA TiCl$_3$/H$_2$SO$_4$ (96%) (2/1/0.3) | 942 | — | 3.9 |
| XIX(a) | DEAC/AA TiCl$_3$/H$_2$SO$_4$—SO$_3$ (SO$_3$-30 wt. %) (2/1/0.17) | 1009 | 3.5 | 1.8 |
| XIX(b) | DEAC/AA TiCl$_3$/H$_2$SO$_4$—SO$_3$ (SO$_3$-30 wt. %) (2/1/0.1) | 1001 | 3.5 | 2.0 |
| XX(a) | DEAC/AA TiCl$_3$/SO$_3$ (2/1/0.1) | 1000 | 3.4 | 2.0 |
| XX(b) | DEAC/AA TiCl$_3$/SO$_3$ (2/1/0.1) | 1000 | 3.1 | 3.5 |

[1]AA TiCl$_3$ - Stauffer Chemical Company - Type 1.1.

TABLE IV

| Example (Run) | (J) | XVIII | XIX | XX |
|---|---|---|---|---|
| Melt Flow Rate (g/10 min. at 230° C.) | 2.9 | 4.6 | 2.9 | 3.0 |
| Hexane Extractables (%) | 1.5 | 2.2 | 1.5 | 1.7 |

TABLE IV-continued

| Example (Run) | (J) | XVIII | XIX | XX |
|---|---|---|---|---|
| Volatiles (%) | 0.25 | 0.40 | 0.23 | 0.48 |
| Density (g/cc) | 0.9073 | 0.9056 | 0.9063 | 0.9057 |
| Heat Deflection Temp (°F.) | 232 | 226 | 238 | 230 |
| Flexural Modulus (10³ psi) | 238 | 211 | 226 | 215 |
| Izod Impact (ft-lb/in) | 0.52 | 0.55 | 0.63 | 0.79 |
| Tensile Impact (ft-lb/in²) | 34.1 | 29.4 | 36.6 | 29.3 |
| Gardner Impact (in-lbs) | 6.33 | 4.20 | 3.57 | 5.80 |
| Yield Tensile Strength (psi) | 5510 | 5310 | 5500 | 5310 |
| Ultimate Tensile Strength (psi) | 3450 | 3070 | 3210 | 3390 |
| Elongation at Yield (%) | 8.67 | 9.43 | 8.23 | 9.05 |
| Elongation at Break (%) | 32 | 65 | 35.2 | 48 |
| Ash (%) | 0.042 | 0.029 | 0.034 | 0.029 |
| Yellowness Index | 6.27 | 3.08 | 5.03 | 2.83 |
| Relative Brightness | 68.5 | 69.7 | 68.4 | 69.9 |
| Oven life-50 mil plaques[1] | | | | |
| 300° F., hours | 165 | 129 | 165 | 93 |
| 320° F., hours | 21 | 25 | 25 | 29 |
| Elemental Analysis (ppm) | | | | |
| X-ray Fluorescence | | | | |
| Ca | 52 | 54 | 49 | 59 |
| Cl | 23 | 22 | 30 | 51 |
| P | 33 | 35 | 35 | 51 |
| S | 1 | 5 | 7 | 4 |
| Ti | 52 | 11 | 9 | 11 |
| Atomic Absorption | | | | |
| Al | 54 | 42 | 47 | 44 |
| Ti | 57 | 12 | 9 | 11 |
| Fe | 7 | 1 | 6 | 1 |
| Na | 35 | 30 | 28 | 25 |
| Ca | 47 | 48 | 46 | 51 |

[1]Failure determined when 10% of surface shows crazing after exposure in circulating air oven.

EXAMPLES XXI–LIII

A series of propylene polymerizations were performed using various hexavalent sulfur mineral acids as a catalyst modifier. Catalyst preparation and polymerizations were performed in the manner described in Examples I–VI. In catalyst preparation, either 0.2 gram of AA TiCl₃ or 0.08 gram of ABC-TiCl₃ was used. Results are shown in Table V.

TABLE V

| Example (Run) | Catalyst (Molar Ratio) | Yield (g/g of TiCl₃) | Hexane Solubles (%) |
|---|---|---|---|
| (K) | DEAC/AA TiCl₃[1] (2/1) | 99.5 | 3.54 |
| (M) | DEAC/AA TiCl₃/BTS/Collidine[2] (2/1/0.02/0.02) | 94.0 | 1.52 |
| XXI | DEAC/AA TiCl₃/SO₃/Collidine (2/1/0.01/0.02) | 82.5 | 1.46 |
| XXII | DEAC/AA TiCl₃/SO₃ (2/1/0.01) | 93.5 | 1.59 |
| XXIII | DEAC/AA TiCl₃/SO₃ (2/1/0.01) | 80 | 1.66 |
| XXIV | DEAC/AA TiCl₃/SO₃/MB[3] (2/1/0.01/0.03) | 94.0 | 1.61 |
| XXV | DEAC/AA TiCl₃/H₂SO₄—SO₃[4] (2/1/0.03) | 102 | 2.03 |
| XXVI | DEAC/AA TiCl₃/H₂SO₄—SO₃ (2/1/0.05) | 99.5 | 1.86 |
| XXVII | DEAC/AA TiCl₃/H₂SO₄—SO₃ (2/1/0.08) | 100.5 | 1.87 |
| XXVIII | DEAC/AA TiCl₃/CSA[5] (2/1/0.03) | 111.5 | 2.23 |
| XXIX | DEAC/AA TiCl₃/CSA (2/1/0.06) | 100.0 | 1.88 |
| XXX | DEAC/AA TiCl₃/H₂SO₄ (96%) (2/1/0.06) | 114.5 | 2.72 |
| XXXI | DEAC/AA TiCl₃/H₂SO₄—SO₃ (2/1/0.06) | 105.5 | 2.45 |
| XXXII | DEAC/AA TiCl₃/H₂SO₄ (96%)/MB (2/1/0.06/0.045) | 128.5 | 1.97 |
| XXXIII | DEAC/AA TiCl₃/H₂SO₄—SO₃/MB (2/1/0.06/0.045) | 104 | 2.84 |
| XXXIV | DEAC/AA TiCl₃/H₂SO₄—SO₃ (2/1/0.1) | 110.5 | 2.66 |
| XXXV | DEAC/AA TiCl₃/H₂SO₄—SO₃ (2/1/0.1) | 100.5 | 2.80 |
| (N) | DEAC/AA TiCl₃ (2/1) | 127.5 | 3.40 |
| XXXVI | DEAC/AA TiCl₃/H₂SO₄—SO₃ (2/1/0.06) | 120 | 2.36 |
| XXXVII | DEAC/AA TiCl₃/H₂SO₄—SO₃ (2/1/0.12) | 108 | 1.88 |
| XXXVIII | DEAC/AA TiCl₃/H₂SO₄—SO₃ (2/1/0.24) | 91 | 1.69 |
| XXXIX | DEAC/AA TiCl₃/H₂SO₄—SO₃ (2/1/0.3) | 71 | 1.82 |
| XL | DEAC/AA TiCl₃/H₂SO₄—SO₃ | 80 | 1.62 |

TABLE V-continued

| Example (Run) | Catalyst (Molar Ratio) | Yield (g/g of TiCl$_3$) | Hexane Solubles (%) |
|---|---|---|---|
| (O) | DEAC/ABC-TiCl$_3$[6] (2/1/0.42) (2/1) | 335 | 1.02 |
| XLI | DEAC/ABC-TiCl$_3$H$_2$SO$_4$—SO$_3$ (2/1/0.18) | 288.8 | 0.59 |
| XLII | DEAC/ABC-TiCl$_3$/H$_2$SO$_4$ (96%) (2/1/0.24) | 273.8 | 0.83 |
| XLIII | DEAC/ABC-TiCl$_3$/H$_2$SO$_4$—SO$_3$/MB (2/1/0.18/0.05) | 283.8 | 0.39 |
| (P) | DEAC/ABC-TiCl$_3$ (2/1) | 331.3 | 1.46 |
| XLIV | DEAC/ABC-TiCl$_3$SO$_3$ (2/1/0.1) | 307.5 | 0.55 |
| XLV | DEAC/ABC-TiCl$_3$/H$_2$SO$_4$—SO$_3$ (2/1/0.1) | 286.3 | 0.62 |
| XLVI | DEAC/ABC-TiCl$_3$/H$_2$SO$_4$ (96%) (2/1/0.1) | 262.5 | 0.88 |
| (Q) | DEAC/ABC-TiCl$_3$ (2/1) | 525.0 | 1.94 |
| (R) | DEAC/ABC-TiCl$_3$/BTS/Collidine (2/1/0.02/0.02) | 476.3 | 0.65 |
| XLVII | DEAC/ABC-TiCl$_3$/CSA/Collidine (2/1/0.02/0.028) | 444.0 | 0.52 |
| XLVIII | DEAC/ABC-TiCl$_3$/CSA (2/1/0.028) | 448.8 | 0.69 |
| XLIX | DEAC/ABC-TiCl$_3$/CSA (2/1/0.056) | 423.8 | 0.62 |
| L | DEAC/ABC-TiCl$_3$/CSA (2/1/0.084) | 390.0 | 0.59 |
| (S) | DEAC/ABC-TiCl$_3$ (2/1) | 455.0 | 1.56 |
| LI | DEAC/ABC-TiCl$_3$H$_2$SO$_4$ (100%) (2/1/0.1) | 411.3 | 0.73 |
| LII | DEAC/ABC-TiCl$_3$/H$_2$SO$_4$ (100%) (2/1/0.2) | 375.0 | 0.70 |
| LIII | DEAC/ABC-TiCl$_3$/H$_2$SO$_4$ (100%) (2/1/0.3) | 342.5 | 0.74 |

[1] AA TiCl$_3$ - Stauffer Chemicals Type 1.1
[2] BTS — Bis-(tributyl)tin sulfide
[3] MB — Methyl benzoate
[4] H$_2$SO$_4$—SO$_3$ - Fuming sulfuric acid-oleum (27-33 wt. % free SO$_3$)
[5] CSA — Chlorosulfonic acid
[6] ABC-TiCl$_3$ (prepared according to U.S. Pat. No. 3,984,350)

EXAMPLES LIV-LXII

In a manner described in Examples VII-XVII, a series of polymerizations were performed in a one-gallon autoclave using either AA TiCl$_3$ or Toho TiCl$_3$ with 96% H$_2$SO$_4$ modifier. In each case 0.4 gram of TiCl$_3$ was used. Results are shown in Table VI.

Table VI

| Example (Run) | Catalyst (Molar Ratio) | Yield (g/g TiCl$_3$) | Hexane Solubles (%) | Extractables (%) | Bulk Density (lb/ft$^3$) |
|---|---|---|---|---|---|
| LIV | DEAC/AA TiCl$_3$/H$_2$SO$_4$[1] (2/1/0.2) | 1685 | 5.7 | 1.6 | 25.3 |
| LV | DEC/AA TiCl$_3$/H$_2$SO$_4$ (2/1/0.2) | 1620 | 6.2 | 1.4 | 24.7 |
| LVI | DEAC/AA TiCl$_3$/H$_2$SO$_4$ (2/1/0.3) | 1381 | 5.6 | 1.3 | 25.3 |
| LVII | DEAC/AA TiCl$_3$/H$_2$SO$_4$ (2.4/1/0.2) | 1646 | 6.2 | 1.7 | 25.8 |
| LVIII | DEAC/AA TiCl$_3$/H$_2$SO$_4$ (2.6/1/0.3) | 1382 | 6.8 | 2.0 | 25.3 |
| LIX | DEAC/Toho-TiCl$_3$/H$_2$SO$_4$[2] (2/1/0.2) | 1672 | 1.5 | 1.7 | 26.2 |
| LX | DEAC/Toho-TiCl$_3$/H$_2$SO$_4$ (2/1/0.3) | 1776 | 1.4 | 1.1 | 23.4 |
| LXI | DEAC/Toho-TiCl$_3$/H$_2$SO$_4$ (2.4/1/0.2) | 1803 | 1.8 | 1.7 | 27.0 |
| LXII | DEAC/Toho-TiCl$_3$/H$_2$SO$_4$ (2.6/1/0.3) | 1834 | 1.6 | 1.6 | 23.6 |

[1] AA TiCl$_3$ - Stauffer Chemical Company Type 1.1
[2] Toho TiCl$_3$ - Toho Titanium Company (TAC) S-13B

EXAMPLES LXIII-LXVIX

A series of propylene polymerizations were performed using 96% sulfuric acid as a catalyst modifier.

Catalyst preparation and polymerizations were performed in the manner described in Examples I–VI. Results are shown in Table VII.

EXAMPLE LXX

A series of propylene polymerizations were performed according to the procedures described in Examples I–VI using sulfamic acid as the hexavalent sulfur mineral acid modifier together with a control run using no modifiers. All runs used DEAC and TiCl$_3$ in a molar ratio of 2 to 1. The control run had a yield (grams of polymer per gram of TiCl$_3$) of 125.5 and Hexane Solubles of 4.3 wt.%. At a sulfamic acid molar ratio to TiCl$_3$ of 0.03, 0.06 and 0.1 the yields were 122.5, 118 and 121 with Hexane Solubles of 4.1, 4.1 and 4.2 wt.% respectively. At a sulfamic acid molar ratio of 0.2 the yield was 122.5 and Hexane Solubles was 3.6 wt.%.

The preceding Examples show that this invention is useful in polymerizations which produce acceptable levels of Hexane Solubles while maintaining catalyst activity. Further, the polymer produced demonstrates overall acceptable odor characteristics.

Table VII

| Example (Run) | Catalyst (Molar Ratio) | Yield (g/g of TiCl$_3$) | Hexane Solubles (%) |
|---|---|---|---|
| (T) | DEAC/AA TiCl$_3$ (2/1) | 108.5 | 4.1 |
| (U) | DEAC/AA TiCl$_3$ (2/1) | 108 | 3.95 |
| LXIII | DEAC/AA TiCl$_3$/H$_2$SO$_4$ (2/1/0.01) | 103.5 | 3.88 |
| LXIV | DEAC/AA TiCl$_3$/H$_2$SO$_4$ (2/1/0.05) | 104 | 3.94 |
| LXV | DEAC/AA TiCl$_3$/H$_2$SO$_4$ (2/1/0.1) | 101.5 | 3.38 |
| LXVI | DEAC/AA TiCl$_3$/H$_2$SO$_4$ (2/1/0.2) | 96 | 2.96 |
| LXVII | DEAC/AA TiCl$_3$/H$_2$SO$_4$ (2/1/0.3) | 97 | 2.81 |
| LXVIII | DEAC/AA TiCl$_3$/H$_2$SO$_4$ (2/1/0.5) | 90.5 | 2.63 |
| LXIX | DEAC/AA TiCl$_3$/H$_2$SO$_4$ (2/1/0.7) | 82 | 2.73 |
| (W) | DEAC/AA TiCl$_3$/H$_2$SO$_4$ (2/1/1.0) | 43 | 4.15 |

I claim:

1. A catalyst composition for the polymerization of propylene or mixtures of propylene and copolymerizable alpha-olefins, which produces low amounts of n-hexane-soluble polymer, comprising a titanium trihalide; an organoaluminum compound selected from the group consisting of dialkyl aluminum halide, trialkyl aluminum, a mixture thereof, and a mixture of trialkyl aluminum with alkyl aluminum dihalide; and a hexavalent sulfur mineral acid or anhydride in a molar ratio to titanium trihalide from about 0.005 to 1 to about 0.7 to 1.

2. The catalyst composition of claim 1 wherein the transition metal compound is titanium trichloride.

3. The catalyst composition of claim 1 wherein the hexavalent sulfur mineral acid or anhydride is sulfuric acid, oleum, halosulfonic acid or sulfur trioxide.

4. The catalyst composition of claim 1 wherein the hexavalent sulfur mineral acid is sulfuric acid.

5. The catalyst composition of claim 1 wherein the hexavalent mineral acid is oleum.

6. The catalyst composition of claim 1 wherein the hexavalent mineral acid is chlorosulfonic acid.

7. The catalyst composition of claim 1 wherein the hexavalent mineral anhydride is sulfur trioxide.

8. The catalyst composition of claim 3 wherein the titanium trihalide is titanium trichloride and the organoaluminum compound is diethylaluminum chloride, triethylaluminum, a mixture thereof or a mixture of triethylaluminum with ethylaluminum dichloride.

9. The catalyst composition of claim 3 wherein the molar ratio of hexavalent mineral acid to titanium trihalide is about 0.01 to 1 to about 0.7 to 1.

10. The catalyst composition of claim 4 wherein the molar ratio of sulfuric acid to titanium trihalide is about 0.01 to 1 to about 0.5 to 1.

11. The catalyst composition of claim 5 wherein the molar ratio of oleum to titanium trihalide is about 0.01 to 1 to about 0.5 to 1.

12. The catalyst composition of claim 7 wherein the molar ratio of sulfur trioxide to titanium trihalide is about 0.01 to 1 to about 0.5 to 1.

13. The catalyst composition of claim 6 wherein the molar ratio of chlorosulfonic acid to titanium trihalide is about 0.01 to 1 to about 0.1 to 1.

14. The catalyst composition of claim 3 wherein the titanium trihalide is titanium trichloride and the organoaluminum compound is diethylaluminum chloride.

15. A process for forming a catalyst composition for the polymerization of propylene or mixtures of propylene and copolymerizable alpha-olefins, which produces low amounts of n-hexane-soluble polymer, comprising mixing in a suitable medium a titanium trihalide; an organoaluminum compound selected from the group consisting of dialkyl aluminum halide, trialkyl aluminum, mixtures thereof, and a mixture of trialkyl aluminum with alkyl aluminum dihalide; and a hexavalent sulfur mineral acid or anhydride in a molar ratio to titanium trihalide from about 0.005 to 1 to about 0.7 to 1.

16. The process of claim 15 wherein the hexavalent sulfur mineral acid is added to a solution of organoaluminum compound in an inert hydrocarbon then the resulting mixture is added to a mixture of titanium trihalide in an inert hydrocarbon.

17. The process of claim 15 wherein the titanium trihalide is titanium trichloride and the organoaluminum compound is diethyl-aluminum chloride.

18. The process of claim 16 wherein the inert hydrocarbon is n-hexane.

19. The process of claim 15 wherein the hexavalent mineral acid is sulfuric acid.

20. The process of claim 15 wherein the hexavalent mineral acid is oleum.

21. The process of claim 15 wherein the hexavalent mineral anhydride is sulfur trioxide.

22. The process of claim 15 wherein the hexavalent mineral acid is chlorosulfonic acid.

* * * * *